Dec. 19, 1944.   F. J. MOLES   2,365,207
HIGH FREQUENCY THERMOCOUPLE
Filed Nov. 9, 1942
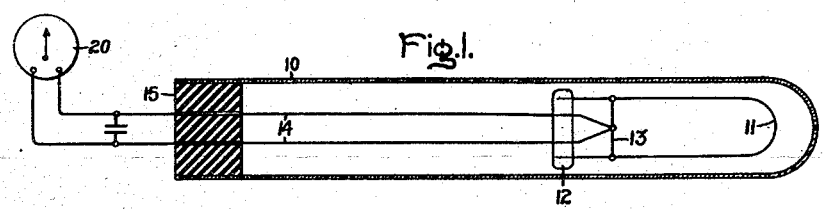
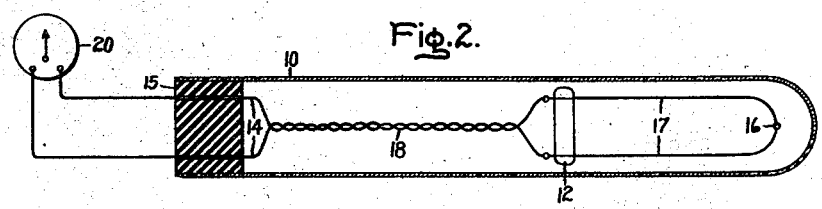
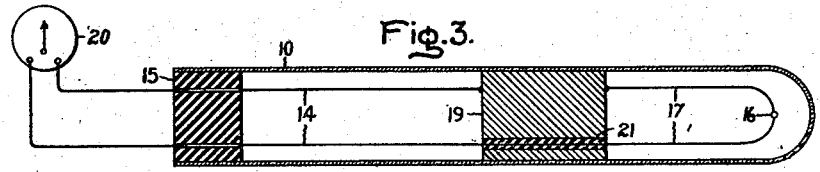
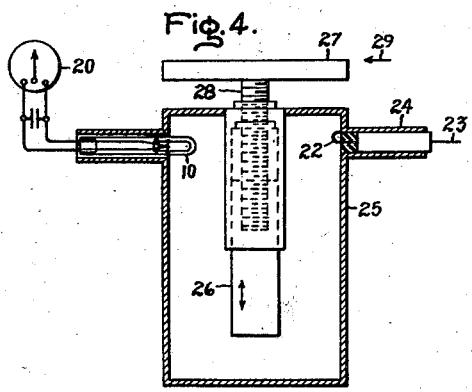
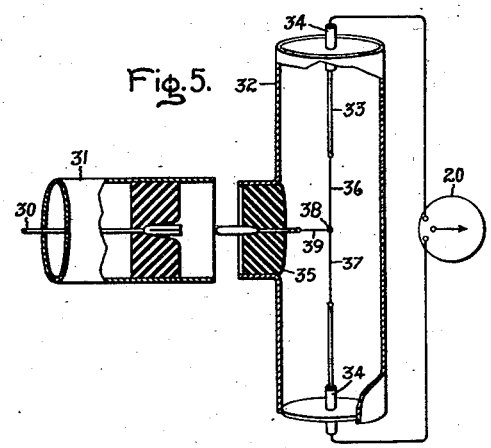
Inventor:
Frank J. Moles,
by Harry E. Dunham
His Attorney.

Patented Dec. 19, 1944

2,365,207

UNITED STATES PATENT OFFICE 2,365,207

HIGH-FREQUENCY THERMOCOUPLE

Frank J. Moles, Schenectady, N. Y., assignor to General Electric Company, a corporation of New York Application November 9, 1942, Serial No. 465,085

5 Claims. (Cl. 171—95)

My invention relates to high frequency current phenomenon detecting and current measuring devices and in particular to a high frequency thermocouple wherein the thermocouple may constitute a part of the high frequency current circuit. The thermocouple heater circuit is preferably sealed in an evacuated chamber to retard loss of heat and prevent oxidation of the heated metals used and means are provided to segregate the high frequency and direct current circuits to the extent desired.

The features of my invention which are believed to be novel and patentable will be pointed out in the claims appended hereto. For a better understanding of my invention reference is made in the following description to the accompanying drawing in which Fig. 1 represents an embodiment of my invention where the alternating and direct current circuits are distinct; Figs. 2 and 3 show modifications where the direct current thermocouple and the high frequency circuit are common. In Fig. 2 the high frequency is kept out of the direct current instrument by twisting the instrument leads and in Fig. 3 by a by-pass condenser. Fig. 4 represents the use of my invention in a wave meter. Fig. 5 represents a modification of my invention for measuring the load current in a concentric cable high frequency circuit, and Fig. 6 is a connector that may be used with the tube of Fig. 5.

Referring to Fig. 1, 10 represents a sealed and evacuated tube which may be made of glass. In one end is a closed conductor loop 11 made of filament wire. The loop is supported by sealing its conductor extensions into a glass support 12. The part 13 of the loop constitutes a heater for a thermocouple having its hot junction secured to heater 13 and its leads 14 extending out of the tube through an insulating seal at 15. The thermocouple is also supported by the support 12. The loop 11—13 is of such dimensions and resistance that when the loop part of the tube is inserted into a high frequency field, high frequency currents are induced therein and the part 13, at least, heated appreciably. The tube shown may be 1⅜ inches in length with the other dimensions in about the proportions represented. The heater element 13 may have a resistance of, say, from 40 to 400 ohms and the thermocouple connected to a microammeter 20 for detecting high frequency current flow in the loop 11—13 which heats the part 13 and the hot junction of the thermocouple. Such a device is convenient for inserting into high frequency field cavities to indicate maximum currents in high frequency wave meters, signal generator attenuators, wave guide exploring devices and the like. For example, a maximum reading will indicate a resonant condition in the circuit producing the high frequency field.

It will be noted that no high frequency circuit leads or connections are required since the high frequency current in the heater loop is induced therein by induction. The heater and pick-up loop and thermocouple are sealed in one small envelope with only the two direct current thermocouple leads brought out. By maintaining the loop 11—13 in a fixed position adjacent to a high frequency current circuit of fixed frequency, the thermocouple may be calibrated in terms of high frequency current flow in such circuit. The device is particularly suitable for use with high frequency currents from 300 to 3000 megacycles. The thermocouple itself may be of standard design. It is noted that the direct current of the thermocouple will not flow in the high frequency loop and as intended to be used the thermocouple circuit does not pick up high frequency current. In Fig. 1 it is not intended that the thermocouple leads 14 will be placed intentionally in pick-up inductive relation with the high frequency field as is the loop 11—13. However, if any high frequency current is induced in the leads 14, it takes the path through the condenser shown connected across the terminals of the instrument 20 rather than through the instrument 20 itself, because the instrument includes a coil, as usual, having inductance which prevents the flow of high frequency current therein under the circumstances where such high frequency current can easily pass through the condenser. If high frequency currents become bothersome in the thermocouple circuit, either of the other expedients of Figs. 2 or 3 may be used to prevent this.

In Fig. 2 the high frequency pick-up loop and thermocouple are combined. The hot junction of the thermocouple is at 16. Of course, in Figs. 2 and 3, the filament portion of the entire high frequency loop 17 is heated as well as the junction at 16, but this does not impair the thermocouple action so long as the instrument ends of the leads remain cool. The high frequency pick-up loop comprises the wires 17 of the thermocouple which are connected together at 16 and coupled at 18 by twisting the insulated direct current instrument leads of the thermocouple together, preferably within the tube. The impedance of the high frequency coupling formed by twisting the wires is insignificant as compared to the impedance of the remainder of the high frequency pick-up loop for the high frequencies contemplated. The close presence of the twisted together wires forms an effective by-pass condenser. This segregates the high frequency circuit from the instrument 20 and no high frequency current flows through the instrument. The very small thermocouple current that flows in the loop 16, 17 is immaterial.

Fig. 3 is much like Fig. 2 except that a more nearly conventional by-pass condenser is used to close the high frequency loop. This by-pass condenser consists of a metal cylinder 19 which also supports the fine wires. It has a small hole bored therethrough at 21 through which one of the thermocouple leads pass and is insulated from the cylinder. The cylinder is one plate and the wire which passes through the hole 21 is the other plate of the by-pass condenser. The other thermocouple instrument lead is through the metal of the cylinder, as shown. Where the device is to be used so that the leads 14 tend to pick up high frequency current, they may be twisted as in Fig. 2 but generally this will be unnecessary if the by-pass condenser of Fig. 3 is used.

In Fig. 4 I have shown a concentric conductor wave meter having a high frequency input loop 22 connected between the inner conductor 23 and outer conductor 24 of a high frequency input concentric conductor cable. The outer conductor 24 connects with the metal shell 25 of a cylindrical cavity which has an adjustable center conductor 26. The device comprises high frequency loading device having inductance and capacity, the relative value of which is adjustable by adjustment of the effective length of the center conductor 26 by a screw 28. At a given input frequency the device may be adjusted to a resonant condition and requires a different adjustment to obtain the resonant condition for each different input frequency. The device may thus be calibrated as an ultra-high frequency meter called a wave meter, such that when the resonant condition is obtained the wave length of the input frequency may be indicated. A dial 27 which rotates with the adjusting screw 28 may have a scale calibrated in wave length and indicated with respect to a stationary index 29. My thermocouple device represented at 10 is used to detect the resonant conditions.

The thermocouple detector 10 is introduced into the resonant cavity through an opening in shell 25 so that its loop will pick up the high frequency signal by inductive coupling. A resonant condition will be indicated by a maximum reading of the instrument 20.

In Fig. 5 I have represented another modification and application of the invention. In Fig. 5, 30 and 31 represent the inner and outer conductors of a concentric cable high frequency supply line having a plug connection circuit adapter at its end. Adapted to be plugged into the end of the high frequency supply line is a concentric cable load line built in the form of a tube preferably sealed and evacuated. The tubular load line is shown disconnected but when connected, its two similar halves are connected in parallel across the load line and terminals the same. In the discussion which follows it will be assumed that the plug connection represented has been completed. The plug arrangement is such as to preserve the concentric cable arrangement. The end of the outer conductor 31 of the supply line is connected to the center section of the outer conductor 32 of the load line. The end of the inner conductor 30 of the supply line is connected to the mid-point of the inner conductor 33 of the load line. The outer and inner conductors of the load line are connected together at their ends, at least one of these high frequency connections and preferably both being by way of a by-pass condenser 34, which may consist of an outer tubular conductor integral with the end wall connection closely surrounding the inner conductor 33 but insulated therefrom. The load line thus comprises a hollow metal cylinder with a conductor running axially through its center and this cylinder is preferably sealed and evacuated as by the sealing plug 35 of insulating material and sealing plugs of insulating material between the plates of the by-pass condensers 34.

The central portion of the inner conductor 33 of the load line is made up of fine wires 36 and 37 of different metals constituting a thermocouple with its hot junction between them at 38 as the point of connection with the inner conductor 30 of the supply line. Also, the section 39 of the supply line may be of considerable resistance so as to be heated by the high frequency currents and thus assist in heating the junction point 38 to which it is connected. The wires 36 and 37 have equal resistances and are heated by the high frequency current and contribute to the heat of the hot junction 38.

The thermocouple thus formed is connected to a D.-C. instrument 20, the connections being through the center conductor 33 which extends axially out of the load line cylinder.

Now, it is seen that the load line constitutes a resistance load for the high frequency supply line, the two similar halves of the load line being connected in parallel across the supply line. Owing to the symmetrical concentric cable arrangement the load is non-inductive and owing to the high resistance of the sections 36, 37 and 39 as compared to the insignificant impedance of the by-pass condensers 34 at high frequency the load is substantially a pure resistance and is thus independent of frequency. The instrument 20 is connected across points of the high frequency circuit at the ends of conductor 33 which are of equal high frequency potential at all times, hence no high frequency current flows into the instrument 20. The direct current thermocouple circuit is, however, segregated from the high frequency line by the by-pass condensers and hence there is no continuous path for D. C. into the high frequency supply line. The thermocouple instrument may, therefore, be used to measure the high frequency current of the supply line independently of frequency variations. If I make the resistance elements of the load of materials having a zero temperature coefficient of resistance the impedance of the load will be independent of the amount of current flowing. Since in either case the load resistance can be measured or calculated, the watt loss can be calculated and the instrument 20 may be calibrated in watt load.

In calibrating the instrument it should be remembered that resistance sections 36 and 37 are in parallel across the supply line and resistance section 39 in series therewith. Half of the high frequency current flows in each resistance section 36 and 37 and all of it in section 39. Thus, as in the other modifications, we have a thermocouple sealed in a vacuum for high efficiency and as in Figs. 2 and 3, portions of the thermocouple circuit are also the high frequency heater circuit but the high frequency and direct currents are effectively segregated for the purposes of the invention, and the impedance characteristics of the high frequency circuit are not altered by the presence and use of the thermocouple. In Fig. 5 the inner and outer conductors of the tube load circuit may be connected together at the plug connections to form a double loop high frequency pick-up antenna. A washer-shaped connector suitable for this purpose is shown in Fig. 6. In any of the loop antenna arrangements greatest sensitivity is obtained when the plane of the loop is placed at right angles to the direction of the inducting field and the sensitivity may be varied by rotating the tube to vary such inductive relation.

What I claim as new and desire to secure by Letters Patent of the United States is:

1. A thermocouple unit for detecting high frequency current phenomenon comprising a sealed and evacuated tube, conductor wires joined together within said tube and forming a thermocouple, connections leading out of said tube for connecting a direct current instrument to said thermocouple, a high frequency alternating current circuit in which said thermocouple wires are included, the flow of high frequency current in such circuit causing the hot junction of said thermocouple to be heated, and said thermocouple wires comprising the sole heating means for the thermocouple, and provisions for segregating the high frequency circuit from the thermocouple instrument connections to the extent necessary to prevent flow of high frequency current to the instrument.

2. Apparatus for detecting high frequency current phenomenon comprising a sealed and evacuated chamber, a pair of wires joined within said chamber forming a thermocouple, connections from said thermocouple leading out of said tube for connecting the thermocouple to a direct current instrument, said thermocouple wires forming portions of a high frequency pick-up loop having no circuit connections to an external circuit, the high frequency pick-up loop connections including by-pass condenser means which prevent short-circuiting of the thermocouple instrument circuit and prevent the flow of alternating current to the direct current instrument, the hot junction of said thermocouple being heated solely by reason of the flow of high frequency currents in said thermocouple wires.

3. A thermocouple unit for detecting high frequency current phenomenon comprising a sealed and evacuated chamber, a thermocouple within said chamber, a pair of wires leading from said thermocouple out of said chamber for connecting said thermocouple to a direct current instrument and a high frequency pick-up loop wholly within said chamber for heating the hot junction of said thermocouple by reason of the flow of high frequency alternating current in said loop, said loop requiring no electrical connections to an external circuit and adapted to be energized with high frequency current by induction from a high frequency alternating current field originating externally of said chamber.

4. A thermocouple unit for detecting high frequency phenomenon comprising a sealed and evacuated tube, a thermocouple within said tube formed by a pair of wires in the form of a hair pin-shaped loop, the wires being joined at the closed end of such loop to form the hot junction of the thermocouple, connections from the open ends of the loop leading out of the tube for connection to a direct current instrument and a by-pass condenser means between said connections within the tube, said thermocouple loop and by-pass condenser means forming a high frequency pick-up loop for heating the hot junction of the thermocouple.

5. A thermocouple unit for detecting high frequency phenomenon comprising a sealed and evacuated tube, a high frequency pick-up loop wholly enclosed within said tube, a thermocouple having its hot junction against said high frequency pick-up loop, and a pair of leads from said thermocouple to the exterior of said tube for connecting to a direct current instrument, such loop being of such dimensions and resistance as to be heated by high frequency currents induced in said loop when the loop portion of the tube is inserted into a high frequency flux field.

FRANK J. MOLES.